(12) United States Patent
Stepniak et al.

(10) Patent No.: US 7,288,718 B2
(45) Date of Patent: Oct. 30, 2007

(54) SEPARABLE ELECTRICAL CONNECTOR COMPONENT FOR SENDING AND RECEIVING COMMUNICATION SIGNALS THROUGH UNDERGROUND POWER DISTRIBUTION LINES

(75) Inventors: Frank M. Stepniak, Hackettstown, NJ (US); Larry N. Siebens, Asbury, NJ (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/256,915

(22) Filed: Oct. 24, 2005

(65) Prior Publication Data

US 2007/0089896 A1    Apr. 26, 2007

(51) Int. Cl.
*H01G 15/02* (2006.01)
(52) U.S. Cl. ............. 174/74 R; 174/77 R; 174/80
(58) Field of Classification Search ......... 174/74 R, 174/74 A, 76, 77 R, 78, 80, 84 R, 84 C, 174/85
See application file for complete search history.

(56) References Cited

U.S. PATENT DOCUMENTS

| | | | | |
|---|---|---|---|---|
| 1,868,962 A | * | 7/1932 | Atkinson | .................. 174/73.1 |
| 2,794,063 A | * | 5/1957 | Nicholas | ..................... 174/143 |
| 3,274,483 A | * | 9/1966 | Tetz | ........................... 323/370 |
| 3,343,153 A | * | 9/1967 | Waehner | .................... 439/490 |
| 3,390,331 A | | 6/1968 | Brown et al. | |
| 3,513,394 A | * | 5/1970 | Tachick | ...................... 324/133 |
| 3,524,178 A | | 8/1970 | Stratton | |
| 3,539,703 A | * | 11/1970 | Cloud | ........................ 174/19 |
| 3,835,353 A | | 9/1974 | Hermstein et al. | |
| 3,882,379 A | * | 5/1975 | Kang | ......................... 324/547 |
| 3,906,477 A | | 9/1975 | Schweitzer, Jr. | |
| 3,939,412 A | | 2/1976 | Hermstein et al. | |
| 4,002,976 A | | 1/1977 | Zulaski | |
| 4,056,680 A | * | 11/1977 | Aihara et al. | .................. 174/19 |
| 4,152,643 A | | 5/1979 | Schweitzer, Jr. | |
| 4,228,318 A | * | 10/1980 | Selsing | ...................... 174/73.1 |
| 4,263,550 A | | 4/1981 | Schweitzer, Jr. | |
| 4,374,605 A | * | 2/1983 | Bratt | ......................... 439/578 |
| 4,641,220 A | | 2/1987 | Schweitzer, Jr. | |
| 4,794,331 A | | 12/1988 | Schweitzer, Jr. | |
| 4,904,932 A | | 2/1990 | Schweitzer, Jr. | |
| 4,935,693 A | * | 6/1990 | Falkowski et al. | .......... 324/127 |
| 4,946,393 A | * | 8/1990 | Borgstrom et al. | ........... 439/88 |
| 5,077,520 A | | 12/1991 | Schweitzer, Jr. | |
| 5,166,600 A | | 11/1992 | Gorablenkow | |
| 5,493,072 A | * | 2/1996 | Stevens | ...................... 174/143 |
| 6,031,368 A | | 2/2000 | Klippel et al. | |
| 6,332,785 B1 | | 12/2001 | Muench, Jr. et al. | |

(Continued)

Primary Examiner—William H. Mayo, III
(74) Attorney, Agent, or Firm—Hoffmann & Baron, LLP

(57) ABSTRACT

An electrical connector component for sending and receiving communication signals through a power distribution line generally includes an internal conductor, an insulative housing surrounding the conductor and a signal filtering device having a medium-voltage end in electrical contact with the internal conductor and an opposite low-voltage terminal. The signal filtering device is adapted to substantially block passage of power signals yet substantially permit passage of communication signals between the medium-voltage end and the low-voltage terminal. In a method for sending and receiving communication signals through a power distribution line, an access point on a power distribution line is provided without de-energizing the power distribution line, passage of power signals through the access point is blocked and passage of communication signals through the access point are permitted.

25 Claims, 6 Drawing Sheets

U.S. PATENT DOCUMENTS 6,538,422 B2    3/2003   Potter et al.
6,547,596 B1 *  4/2003   Pavlovic et al. ....... 439/620.07
6,843,685 B1    1/2005   Borgstrom et al.

* cited by examiner

SEPARABLE ELECTRICAL CONNECTOR COMPONENT FOR SENDING AND RECEIVING COMMUNICATION SIGNALS THROUGH UNDERGROUND POWER DISTRIBUTION LINES

FIELD OF THE INVENTION

The present invention relates to electrical cable connectors, and more particularly to an electrical connector component which provides access to a power distribution cable for sending and receiving communication signals through the cable and which has standard coupling or interface structure that permits separable connection of the component to existing field installed electrical cable connectors.

BACKGROUND OF THE INVENTION

Connections in medium-voltage underground power distribution systems, such as between cables and transformers, are generally accomplished with specially designed separable male and female electrical connectors, such as loadbreak connectors and deadbreak connectors. Loadbreak cable connectors, used in conjunction with 15, 25 and 35 kV systems, generally include a power cable elbow connector and a loadbreak bushing insert. The elbow connector has one end adapted for receiving a power cable and another end adapted for receiving an insertion end of the loadbreak bushing insert. The opposite end of the bushing insert, which extends outward from the elbow connector, may in turn be received in a bushing well of a transformer, for example.

Such loadbreak elbows typically comprise a conductor surrounded by a semiconducting layer and an insulating layer, all encased in a semiconductive outer shield. The end of the elbow adapted for receiving the bushing insert generally includes a conically tapered inner surface, which mates with a conically tapered outer surface formed on the insertion end of the bushing insert. When connected with a bushing insert, the conductor encased in the elbow makes mechanical and electrical contact with a conductor encased in the bushing insert. The elbow may further include a cuff at its bushing receiving end for providing an interference fit with a molded flange on the bushing insert. This interference fit between the elbow cuff and the bushing insert provides a moisture and dust seal therebetween.

Power distribution service personnel, whose function is to monitor and control such underground power distribution systems, often need to access the cables and connectors to facilitate servicing and repairs. One of the first steps required in servicing underground cable systems is the identification (e.g., phase A or phase B) of one cable from another as it traverses underground from manhole to manhole. One way of identifying cables is to inject a signal voltage onto a cable at one location and then detect the signal on the same cable at another location.

However, this procedure requires de-energization of the power distribution system, separation of electrical connectors and installation of devices for transmitting and receiving tracing signals. Obviously, this conventional procedure results in undesirable long system outage time.

Accordingly, it would be advantageous to inject a signal voltage onto the conductor of an underground power distribution cable at one location and detect the signal at another location for communications, monitoring and control, without having to de-energize the cable or separate the electrical connectors. It would also be desirable to provide a component that permits such signal transmission and detection, which can be installed in existing field installed connection arrangements.

SUMMARY OF THE INVENTION

The present invention is an electrical connector component for sending and receiving communication signals through a power distribution line. The electrical connector component generally includes an internal conductor, an insulative housing surrounding the conductor and a signal filtering device having a medium-voltage end in electrical contact with the internal conductor and an opposite low-voltage terminal. The signal filtering device is adapted to substantially block or filter passage of power signals yet substantially permit passage of communication signals between the medium-voltage end and the low-voltage terminal.

In a preferred embodiment, the signal filtering device permits passage of substantially all communication signals having a frequency greater than about 60 Hz, and more preferably, the signal filtering device permits passage of substantially all communication signals having a frequency in the range of about 1,000 Hz to about 1 MHz. In this regard, the signal filtering device is preferably a capacitive element which presents a greater impedance to lower frequency power signals and a lower impedance to higher frequency communication signals.

The signal filtering device is preferably encapsulated within the insulative housing and the insulative housing preferably includes an access port or bore formed in a protruding boss portion of the insulative housing for permitting access to the low-voltage terminal of the signal filtering device. The insulative housing may include a radially enlarged mid-section and a conically tapered insertion end extending from the mid-section, wherein the insertion end is adapted for interference fit insertion in a mating elbow connector. Alternatively, the insulative housing may include a conically tapered cavity formed therein for receiving a mating bushing insert.

In both embodiments, the connector component further preferably includes an internal load resistor in electrical communication with the low-voltage terminal of the signal filtering device for reducing the voltage output at the low-voltage terminal. Also, the low-voltage terminal is preferably adapted for electrical connection with at least one of a signal generating device and a signal receiving device.

The present invention further involves a method for sending and receiving communication signals through a power distribution line. The method generally includes the steps of providing an access point on a power distribution line without de-energizing the power distribution line, generating a communication signal and inputting the signal into the power distribution line through the access point, filtering power signals from passing through the access point and detecting the communication signals permitted to pass through the access point.

The access point is preferably provided by an electrical connector component connected to the power distribution line. The electrical connector component includes a signal filtering device having a medium-voltage end in electrical communication with the power distribution line and an opposite low-voltage terminal. The signal filtering device blocks passage of substantially all power signals yet permits passage of substantially all communication signals between the medium-voltage end and the low-voltage terminal.

A preferred form of the electrical connector component, as well as other embodiments, objects, features and advantages of this invention, will be apparent from the following detailed description of illustrative embodiments thereof, which is to be read in conjunction with the accompanying drawings.

DETAILED DESCRIPTION OF ILLUSTRATIVE EMBODIMENTS

Figure 1:
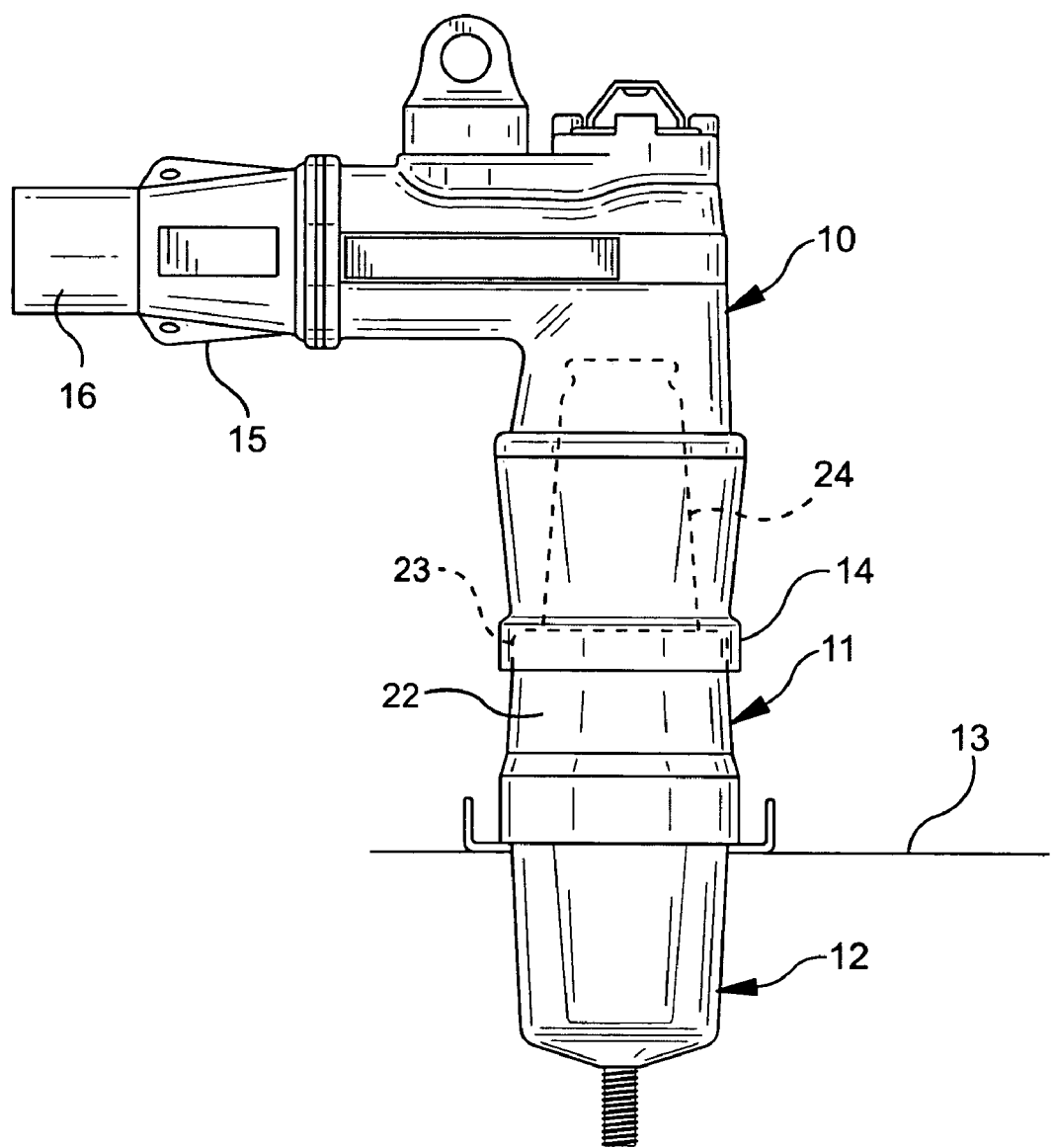
FIG. 1 is a side view of a conventional elbow connector, loadbreak bushing insert and bushing well of the prior art.
Figure 2:
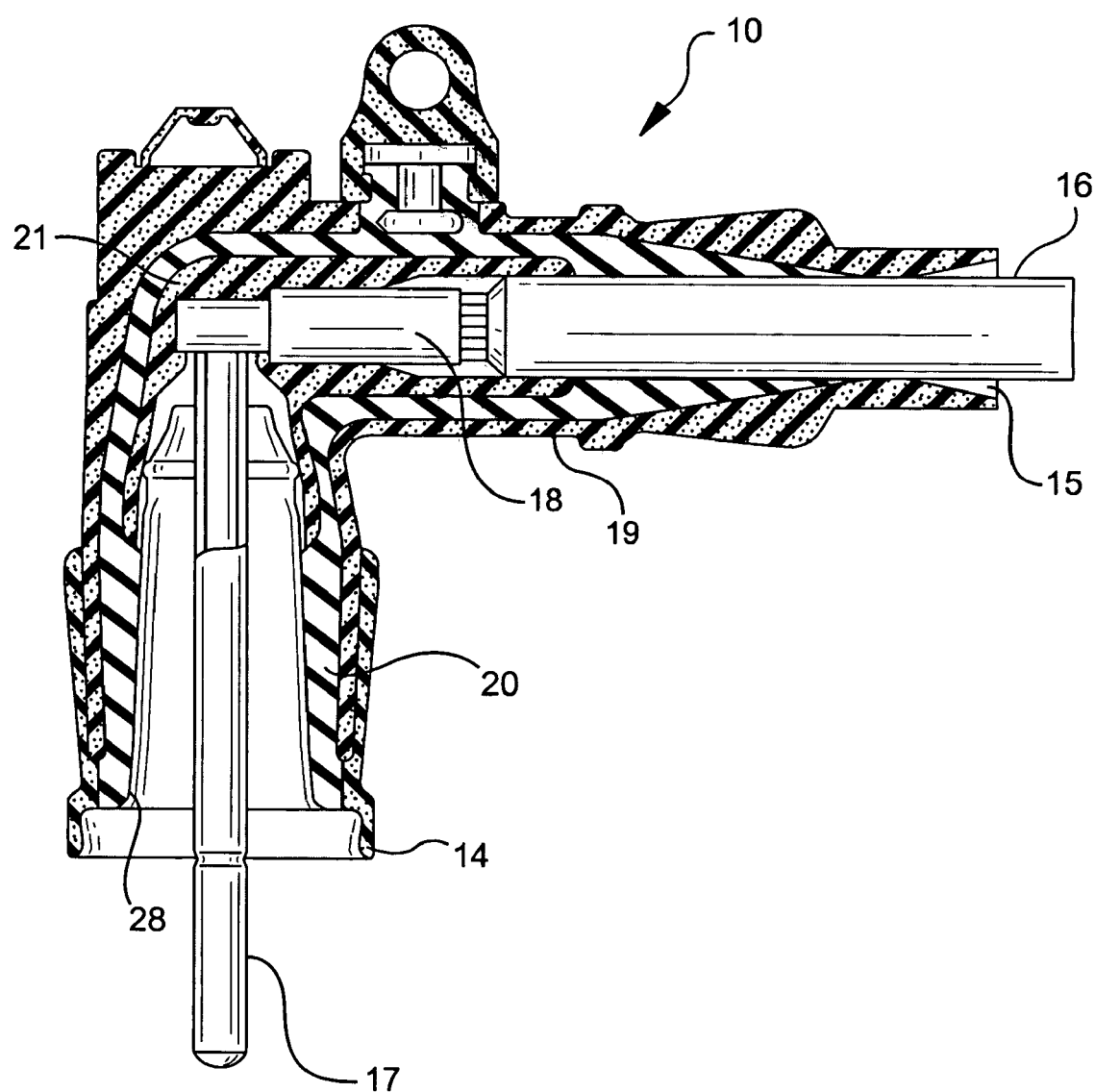
FIG. 2 is a cross-sectional view of a conventional elbow connector of the prior art.
Figure 3:
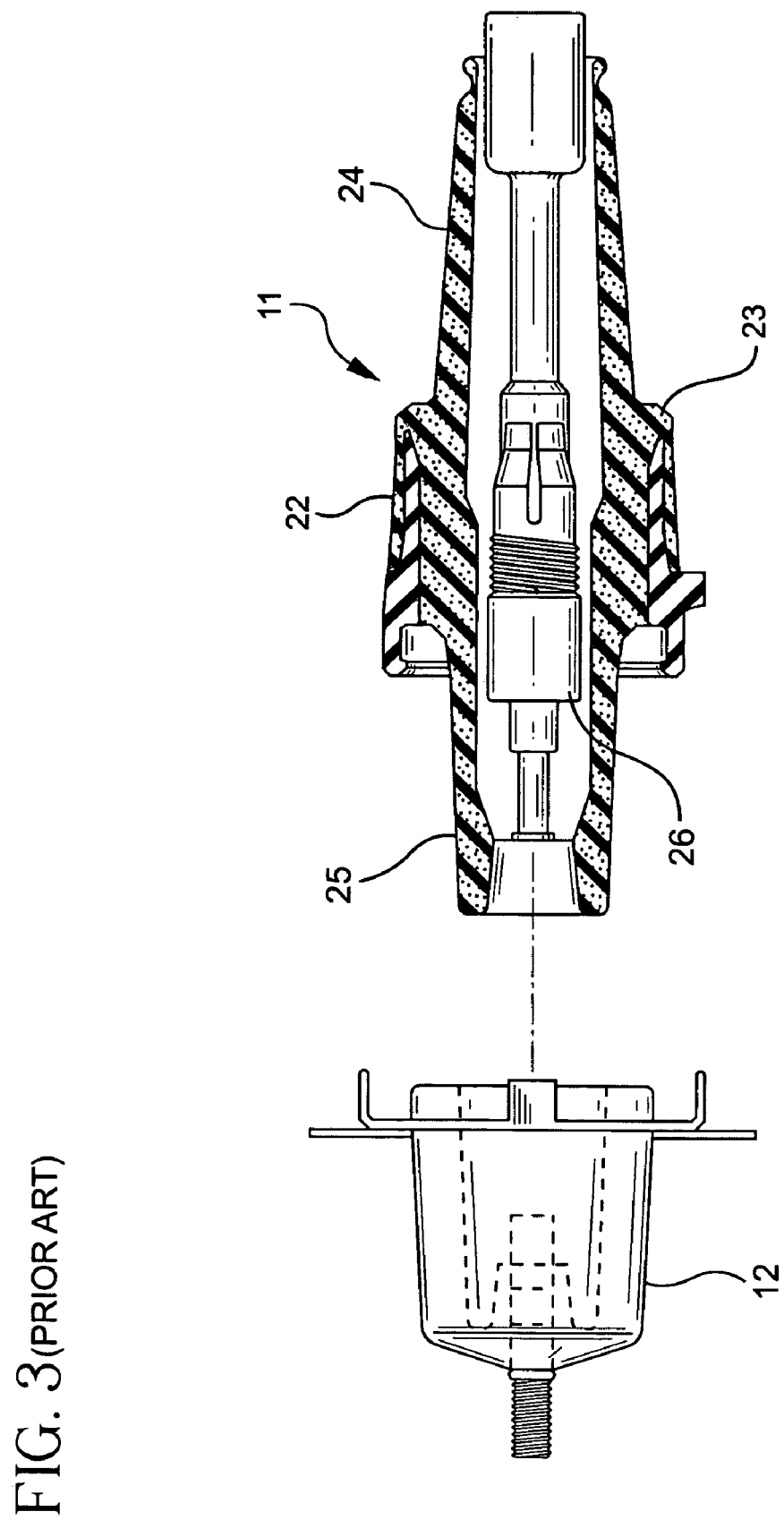
FIG. 3 is a cross-sectional view of a conventional loadbreak bushing insert and bushing well of the prior art.

Referring first to FIGS. 1-3, conventional 200 A loadbreak connectors are illustrated. In FIG. 1, a power cable elbow connector 10 is illustrated coupled to a loadbreak bushing insert 11, which is seated in a universal bushing well 12. The bushing well 12 is seated on an apparatus face plate 13. The power cable elbow connector 10 includes a first end 14 adapted for receiving the loadbreak bushing insert 11 and has a flange or elbow cuff surrounding the open receiving end thereof. A power cable receiving end 15 is provided at the opposite end of the power cable elbow connector 10 and a cable 16 having a conductive member therein extends from the power cable receiving end for connection to a power distribution cable (not shown).

FIG. 2 is a cross-sectional view of a conventional power cable elbow connector 10, which includes a cable receiving end 15 having a cable 16 extending outwardly therefrom. The other end of the power cable elbow 10 is a loadbreak bushing insert receiving end 14 having a probe or energized electrode 17 positioned within a central opening of the bushing receiving end. The probe 17 is in electrical communication with the conductive member 16 via a connection element 18. The power cable elbow 10 includes an electrically conductive shield 19 formed from a conductive peroxide-cured synthetic rubber, known and referred to in the art as EPDM. Within the shield 19, the power cable elbow 10 includes an insulative inner housing 20, typically molded from an insulative rubber or epoxy material, and within the insulative inner housing, the power cable elbow connector includes a conductive insert 21 which surrounds the connection element 18.

FIG. 3 is a cross-sectional view of a conventional loadbreak bushing insert 11. The loadbreak bushing insert 11 includes a mid-section 22 having a larger dimension than the remainder of the bushing insert. Extending in one direction from the mid-section 22 is a conically tapered upper section 24 which is inserted into the power cable elbow connector 10. Between the mid-section 22 and the upper section 22 is a transition shoulder portion 23. The transition shoulder portion 23 and the elbow cuff 14 of the elbow connector 10 provide a moisture and dust seal through an interference fit therebetween.

Extending in the opposite direction from the mid-section 22 is a bushing well insertion end 25, which is adapted for insertion into a universal bushing well 12. The loadbreak bushing insert 11 further includes a current carrying member 26 for providing electrical connection from the elbow 10 to the bushing well 12 through the insert.

Figure 4:
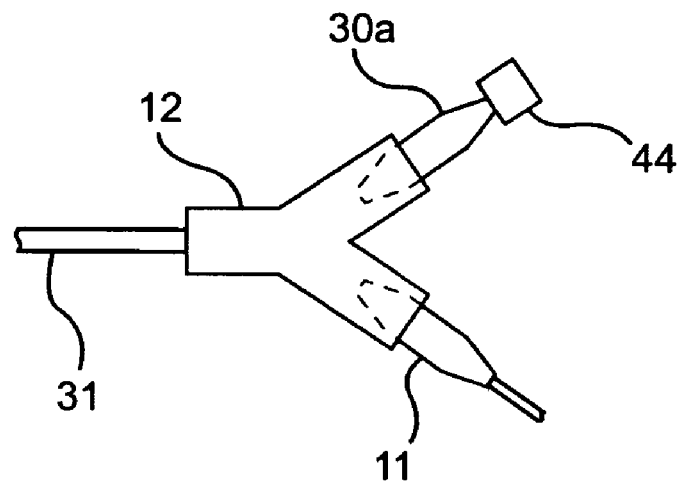
FIG. 4 is a schematic view of a Y-type elbow connector having an electrical connector component of the present invention connected thereto.
Figure 5:
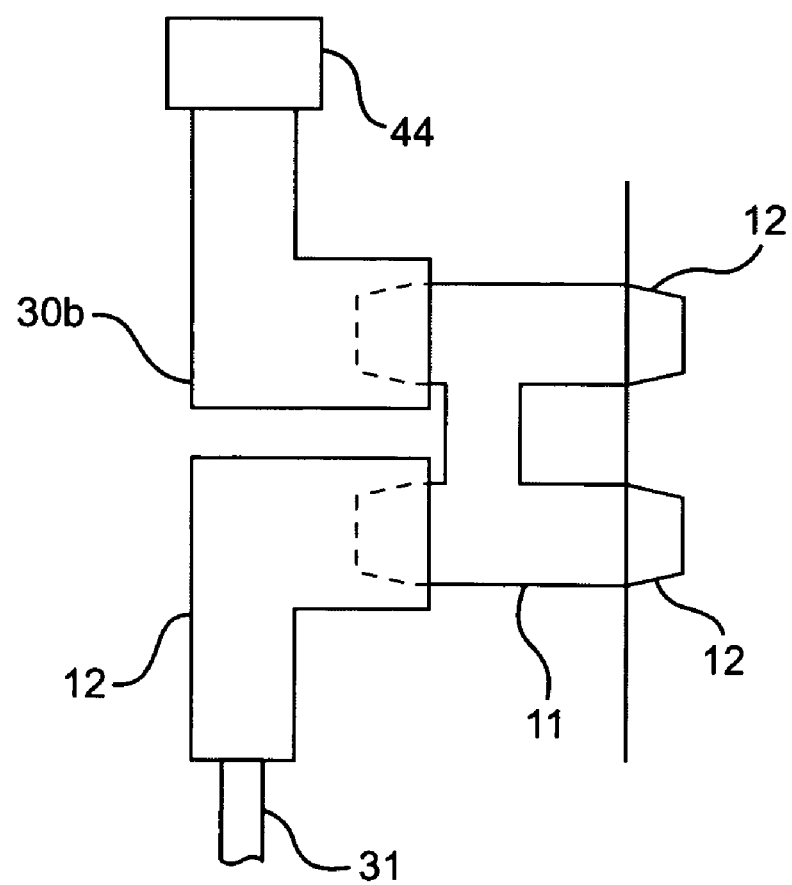
FIG. 5 is a schematic view of an H-type bushing insert having an electrical connector component of the present invention connected thereto.

Turning now to FIGS. 4 and 5, the present invention is a separable connector component 30a or 30b that is intended to take the place of a conventional connector in an existing power cable connection scenario so as to provide a safe access point into the power line 31 without any retrofitting. Specifically, the connector component 30a and 30b of the present invention is provided with a standard interface making it adapted to be connected in the field to an existing elbow connector or an existing multiple connecting point connector, such as a Y-connector, T-connector or an H-connector, to establish a signal transmission and receiving port, while maintaining the continuity of the power line.

In this regard, the separable connector component 30a or 30b of the present invention may be made similar in size and shape to a conventional 200 A bushing insert 11 (or similarly shaped elbow insulating plug) or elbow 10, as shown in FIGS. 1-3, and be adapted to interconnect with respective 200 A mating connectors. However, the present invention is particularly well suited for interconnection with 600 A, 15 kV or 25 kV medium-voltage connectors since such connectors are typically bolted in place and the present invention eliminates the need to unbolt these connectors.

Figure 6:
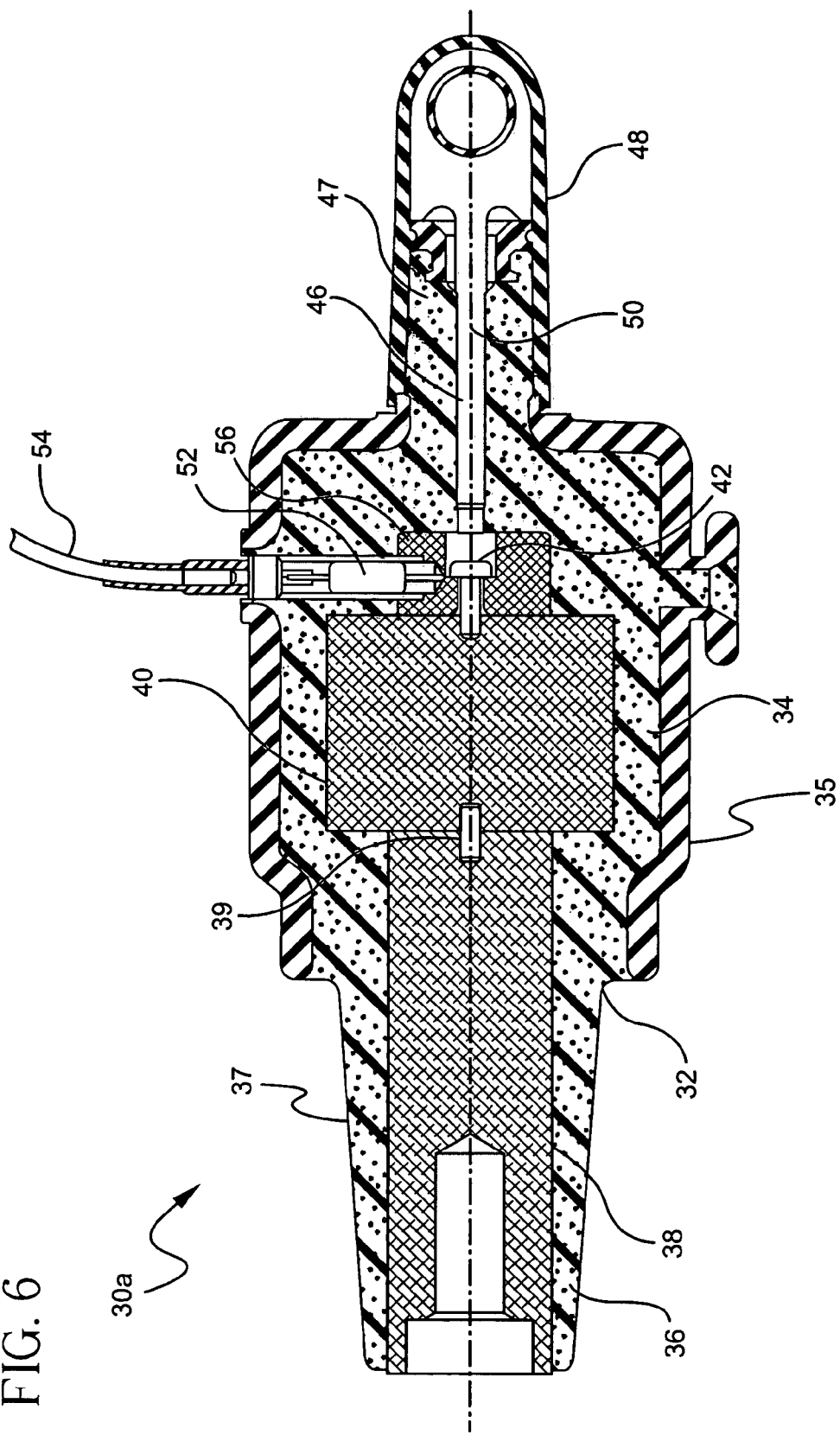
FIG. 6 is a cross-sectional view of an electrical connector component of the present invention in the form of a bushing insert.

Thus, FIG. 6 shows a 600 A separable connector component 30a, according to the present invention, in the form of an elbow insulating plug, which has a somewhat similar size and shape to a conventional 200 A loadbreak bushing insert 11. Thus, like a conventional loadbreak bushing insert, the connector component 30a includes a molded insulative housing 32 having an enlarged mid-section 34 and enclosed within a conductive shield 35. The connector component 30a also has a conically tapered upper section 36 extending from the mid-section and having an outer surface 37 which is sized and shaped to be interference-fit within a standard mating connector. The connector component 30a further includes a contact or bus bar 38 centrally disposed within the upper section 36, which is adapted to electrically couple with a conductor of a mating elbow connector, as would a conventional bushing insert. Thus, the connector component 30a shown in FIG. 6 is designed for a water-tight, fully insulated connection with existing field-installed 600 A elbow-type connectors.

However, the connector component 30a of the present invention further includes at least one signal filtering device 40 encapsulated within the insulative housing 32. Preferably, the filtering device 40 is molded within the insulative housing 32 during molding of the housing. Alternatively, the filtering device 40 can be pressed into the housing 32 after molding.

The filtering device 40 is on one side in electrical communication with the bus bar 38 and is provided on its opposite side with a low-voltage terminal 42. Electrical contact between the filtering device 40 and the bus bar 38 can be achieved, for example, with a threaded rod 39. The low-voltage terminal 42, on the opposite side, is in turn adapted to be connected with a signal generating/receiving device 44, as shown in FIGS. 4 and 5, so that a low-voltage signal can be input to or received from an energized power line through the connector component 30a. In a preferred embodiment, the connector 30a includes two signal filtering devices 40 connected in series to better distribute the voltage.

The signal filtering device 40 is preferably a conductive member in close proximity to the medium voltage conductor to form a capacitive element. While it has been common practice to form capacitors in this way, the capacitance levels produced have been sufficient to detect the power frequency voltage, but not a signal voltage. Thus, the connector component of the present invention overcomes these problems by providing a capacitive element of sufficient value to limit signal attenuation so it can be detected in the presence of system power voltage.

Specifically, the capacitive element presents a greater impedance to lower frequency power signals and presents a lower impedance to higher frequency communication signals. In this manner, the capacitive signal filtering device 40 serves to substantially filter or block signals in the standard 50-60 Hz power frequency range but permit passage of signals above 60 Hz. Preferably, a capacitive signal filtering device 40 is selected having an impedance value which permits passage of communication signals in the 1000 Hz-1 MHz frequency range.

A suitable off-the-shelf capacitive element 40 for use in the present invention is a large high-voltage ceramic capacitor having a capacitance about 1900 pico farads, an impedance of about 2.8 mega ohms and a resistance of about 370 ohms. Such a capacitor is sufficient to limit signal attenuation so that a low-voltage signal can be detected in the presence of the system power voltage. It has been found that the DHS Series Capacitors supplied by Murata Manufacturing Co. (www.murata.com) are suitable for use in the present invention.

Access to the low-voltage terminal 42 of the filtering device 40 is achieved via a direct access port or bore 46 formed in the insulative housing 32. The access bore 46 provides a port for connection with a signal generating/receiving device 44 to send or detect a low-voltage signal through the component 30a. The access bore 46 may be similar to the type formed in conventional elbow connectors for cable restoration fluid injection. Moreover, the access bore 46 is preferably formed in a protruding boss portion 47 of the insulative housing which simulates a voltage detection point of a conventional connector. In this manner a standard voltage test cap, such as Voltage Test Cap No. 200TC-1, obtainable through the Elastimold Division of Thomas & Betts Corp., Hackettstown, N.J., may be utilized as an interface between the connector 30a and the signal generating/receiving device 44. Connection through the port 46 can be temporary, as it would be for cable identification, or permanent, as in the case of communication applications for circuit control.

A removable insulated protective cap 48 is preferably provided to seal the direct access bore 46 when the connector component 30a is not connected to a signal generating/receiving device 44. The cap 48 preferably includes a prong 50 extending into the bore 46 when the cap is secured on the housing 32.

For additional safety, the connector component 30a further preferably includes an internal load resistor 52 connected to ground via a grounding wire 54. The internal load resistor 52 may also be integrally molded with the insulative housing 36, or it may be subsequently installed in or assembled to the connector component 30a. The internal load resistor 52 is positioned in the insulative housing 36 so as to be in electrical contact with the low-voltage terminal 42 to reduce the power frequency voltage output based on the selected value of the resistor. A resistor 52 having a resistance value of between about 4,000-30,000 ohms is sufficient in this regard. Connection between the low-voltage terminal 42 and the internal load resistor 52 may be facilitated via a connection block 56, which permits dual connection of the terminal to the resistor and the signal generating/receiving device 44.

Figure 7:
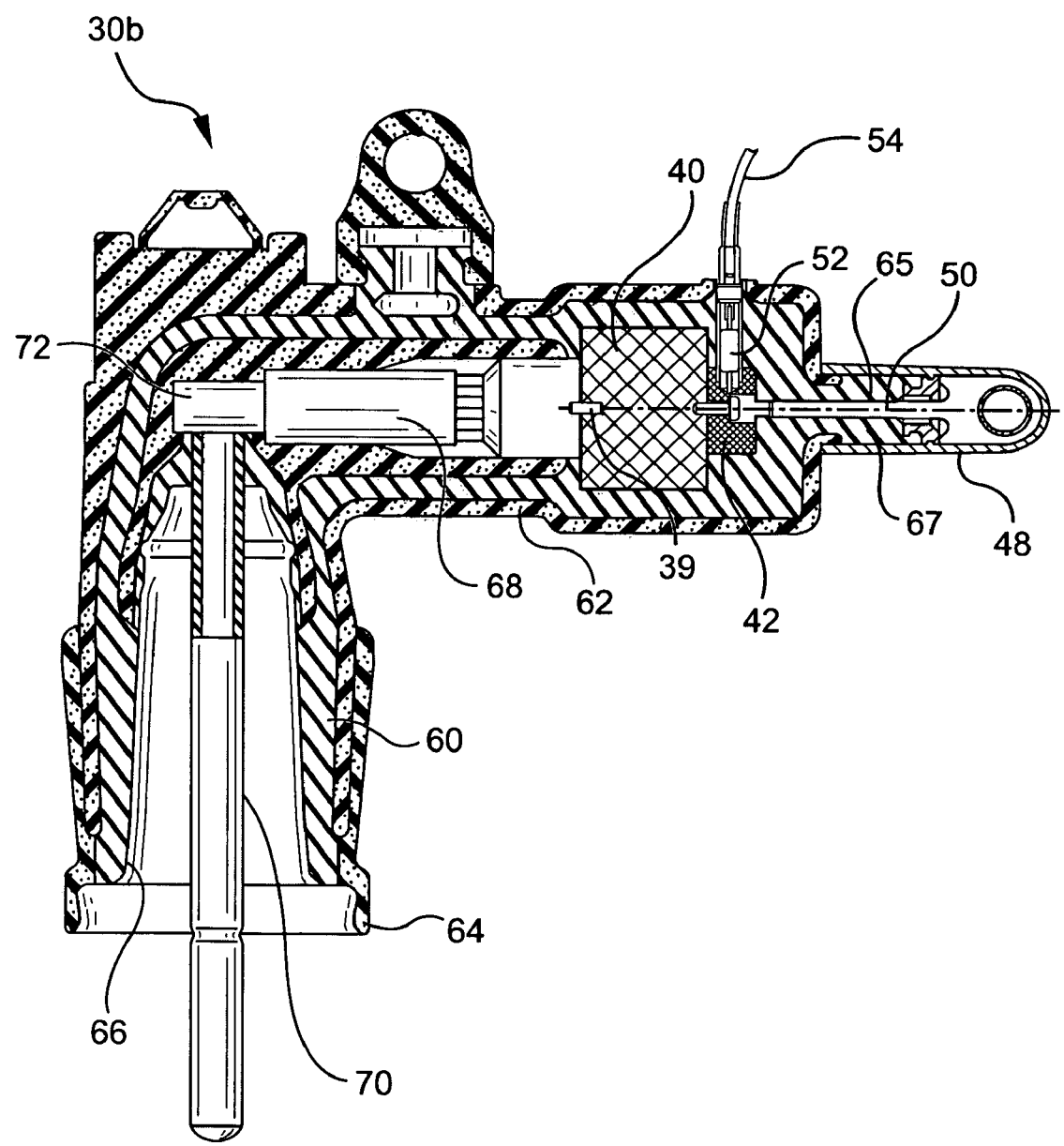
FIG. 7 is a cross-sectional view of an electrical connector component of the present invention in the form of an elbow connector.

As mentioned above, the connector component of the present invention can take various forms and be adapted for connection to connectors with various electrical ratings. For example, FIG. 7 shows a separable connector component 30b, according to an alternative embodiment of the present invention, in the form of a 200 A elbow-type connector. Thus, like a conventional elbow connector, the connector component 30b includes a molded insulative housing 60, typically molded from an insulative rubber or epoxy material, enclosed within a conductive shield 62 and having a bushing insertion end 64. The bushing insertion end 64 has an internal conically tapered cavity 66 for receiving a mating conventional loadbreak bushing insert. The conically tapered cavity 66 of the connector component 30b is sized and shaped to be interference-fit with a mating loadbreak bushing insert or a multiple connecting point connector, as would a conventional elbow connector.

Also like a conventional elbow connector, the connector component 30b includes a conductive member 68 connected to a probe 70 via a connection element 72. The probe 70 is positioned within the central opening of the bushing receiving end 64 to be electrically connected with a contact of a bushing insert, or a multiple connecting point connector.

Like the bushing-type connector component 30a described above, the elbow-type connector component 30b of the present invention further includes at least one capacitive element 40 encapsulated within the insulative housing 20. Again, the capacitive element 40 is preferably molded within the insulative housing 60 during molding of the housing. The capacitive element 40 is in electrical communication on one side with the conductive member 68 and is provided on its opposite side with a low-voltage terminal 42. Electrical contact between the capacitive element 40 and the conductive member 68 can again be achieved, for example, with a threaded rod 39. The low-voltage terminal 42, on the opposite side, is in turn adapted to be connected with a signal generating/receiving device 44, as described above.

Access to the low-voltage terminal 42 is achieved via a direct access bore 65 formed in a protruding boss portion 67 of the insulative housing 60 and a removable protective cap 48, as described above, may be provided to seal the direct access bore 65 when the connector component 30b is not connected to a signal generating/receiving device 44. Again, a standard voltage test cap may be utilized as an interface between the connector component 30b and the signal generating/receiving device 44 to minimize shock hazards. Moreover, an internal load resistor 52 is also preferably provided to reduce the power frequency voltage output of the power line, as described above.

In use, the connector component 30a or 30b of the present invention provides a direct access point for inputting and receiving low-voltage communication signals via a power distribution line. A signal generating/receiving device 44 is simply connected to the direct access port 46 or 65 of a connector component 30a or 30b, already installed in the field, to send or receive signals via the power distribution line. As a result, the line does not need to be de-energized, nor do any connectors need to be disassembled.

Thus, the connector component 30a, 30b incorporating a capacitive element in a separable connector component provides a proven safe connection method to a utility distribution system for the sending and receiving of communication signals over the power cables. Moreover, the access to the output of the connector component 30a, 30b is provided through a direct access port that is insulated and sealed against water egress. Finally, the connector components 30a, 30b of the present invention include standard interfaces for easy application to existing distribution systems.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An electrical connector component comprising:
   an internal conductor;
   an insulative housing surrounding said conductor;
   a signal filtering device having a medium-voltage end in electrical contact with said internal conductor and an opposite low-voltage terminal, said signal filtering device being adapted to substantially block passage of power signals yet substantially permit passage of communication signals having a frequency in the range of about 1,000 Hz to about 1 MHz between said medium-voltage end and said low-voltage terminal; and
   a communication signal generating/receiving device connected to said low-voltage terminal of said signal filtering device for inputting a low-voltage communication signal into said signal filtering device.

2. An electrical connector component as defined in claim 1, wherein said signal filtering device is a capacitive element for presenting a greater impedance to lower frequency power signals and a lower impedance to higher frequency communication signals.

3. An electrical connector component as defined in claim 2, wherein said capacitive element is a high-voltage ceramic capacitor having a capacitance of about 1900 pico farads, an impedance of about 2.8 mega ohms and a resistance of about 370 ohms.

4. An electrical connector as defined in claim 1, wherein said signal filtering device is encapsulated within said insulative housing and wherein said insulative housing includes an access bore formed therein for permitting access to said low-voltage terminal of said signal filtering device.

5. An electrical connector as defined in claim 4, wherein said access bore is formed in a protruding boss portion of said insulative housing.

6. An electrical connector as defined in claim 4, wherein said insulative housing includes a radially enlarged mid-section and a conically tapered insertion end extending from said mid-section, said insertion end being adapted for interference fit insertion in a mating connector and said signal filtering device being molded within said radially enlarged mid-section.

7. An electrical connector as defined in claim 1, wherein said insulative housing includes a conically tapered cavity formed therein for receiving a mating insert.

8. An electrical connector as defined in claim 1, wherein the connector has an electrical rating of between 200 A and 600 A and between 15 kV and 35 kV.

9. An electrical connector as defined in claim 1, further comprising:
   an internal load resistor in electrical communication with said low-voltage terminal of said signal filtering device for reducing the voltage output at said low-voltage terminal; and
   a connection block connected between said internal load resistor and said low-voltage terminal of said signal filtering device for providing said electrical communication therebetween, said connection block permitting dual connection of said internal load resistor and said communication signal generating/receiving device to said low-voltage terminal of said signal filtering device.

10. An electrical connector component as defined in claim 1, wherein said internal conductor comprises a first end, adapted to be electrically connected to a power line of a distribution system, and a second end terminating within said insulative housing, said termination of said second end of said conductor creating a dead-end for the power line of the distribution system.

11. An electrical connector component as defined in claim 1, further comprising a rod connected between said internal conductor and said signal filtering device for permitting direct electrical contact between said internal conductor and said medium-voltage end of said signal filtering device.

12. A method for sending and receiving communication signals through a power distribution line comprising the steps of:
   providing an access point on a power distribution line without de-energizing said power distribution line;
   generating a communication signal having a frequency in the range of about 1,000 Hz to about 1 MHz;
   inputting said signal into the power distribution line through said access point;
   filtering power signals from passing through said access point; and
   detecting the communication signals permitted to pass through said access point.

13. A method as defined in claim 12, wherein substantially all communication signals having a frequency greater than about 60 Hz are permitted to pass through said access point.

14. A method as defined in claim 12, wherein said access point is provided by an electrical connector component connected to said power distribution line, and said step of filtering comprises a signal filtering device in the electrical connector component having a medium-voltage end in electrical communication with said power distribution line and an opposite low-voltage terminal, said signal filtering device filtering power signals yet permitting passage of communication signals between said medium-voltage end and said low-voltage terminal.

15. A method as defined in claim 14, wherein said signal filtering device is a capacitive element for presenting a greater impedance to lower frequency power signals and a lower impedance to higher frequency communication signals.

16. A method as defined in claim 14, wherein said signal filtering device is encapsulated within an insulative housing of the electrical connector component, the housing having an access bore formed therein for permitting access to said low-voltage terminal of said signal filtering device.

17. A method as defined in claim 16, wherein said access bore is formed in a protruding boss portion of said insulative housing.

18. A method as defined in claim 16, wherein said insulative housing includes a radially enlarged mid-section and a conically tapered insertion end extending from said mid-section, said insertion end being adapted for interference fit insertion in a mating connector and said signal filtering device being molded within said radially enlarged mid-section.

19. A method as defined in claim 16, wherein said insulative housing includes a conically tapered cavity formed therein for receiving a mating insert.

20. A method as defined in claim 14, further comprising the step of reducing a voltage output at said access point with an internal load resistor in electrical communication with said low-voltage terminal of said signal filtering device, said electrical connector component further comprising a connection block connected between said internal load resistor and said low-voltage terminal of said signal filtering device for providing said electrical communication therebetween, said connection block permitting dual connection of said internal load resistor and a communication signal generating/receiving device to said low-voltage terminal of said signal filtering device.

21. A method as defined in claim 14, wherein said step of providing an access point comprises the step of connecting said electrical connector component to a multiple connecting point connector of the power distribution line, said electrical connector creating a dead-end for the power line of the distribution system.

22. A method as defined in claim 21, wherein said multiple connecting point connector of the power distribution line is one of a Y-connector, a T-connector or an H-connector.

23. A method as defined in claim 12, further comprising the step of connecting a signal generating/receiving device to said access point, said signal generating/receiving device generating and inputting said communication signal into the power distribution line through said access point.

24. A separable electrical connector for use in a voltage distribution system comprising:

an insulative housing having a first end adapted for connection to the distribution system and a second end opposite said first end adapted for inputting/receiving communication signals;

a conductor embedded in said housing, said conductor having a first end adapted to be electrically connected to a power line of the distribution system, and a second end terminating within said second end of said housing, said termination of said second end of said conductor creating a dead-end for the power line of the distribution system;

a capacitive element embedded in said housing and having a first end in electrical communication with said second end of said conductor and a second end adapted for inputting/receiving the communication signals from said second end of said housing without de-energizing the cable; and a communication signal generating/receiving device attached to said second end of said housing and in electrical communication with said second end of said capacitive element for inputting a low-voltage communication signal into said conductor.

25. An electrical connector component as defined in claim 24, wherein said capacitive element is a high-voltage ceramic capacitor having a capacitance of about 1900 pico farads, an impedance of about 2.8 mega ohms and a resistance of about 370 ohms.

* * * * *